US009538002B2

(12) United States Patent
Watson

(10) Patent No.: US 9,538,002 B2
(45) Date of Patent: Jan. 3, 2017

(54) REPEAT CONTACT ENGINE

(71) Applicant: Nuance Communications, Inc., Burlington, MA (US)

(72) Inventor: Andrew J. Watson, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 213 days.

(21) Appl. No.: 13/833,955

(22) Filed: Mar. 15, 2013

(65) Prior Publication Data

US 2014/0270107 A1 Sep. 18, 2014

(51) Int. Cl.
H04M 1/64 (2006.01)
*H04M 3/493* (2006.01)
*H04M 3/51* (2006.01)
H04M 11/00 (2006.01)

(52) U.S. Cl.
CPC ........... *H04M 3/493* (2013.01); *H04M 3/5166* (2013.01)

(58) Field of Classification Search
CPC ..................... H04M 3/42059; H04M 3/42068; H04M 3/493; H04M 3/5166
USPC ............................................ 379/88.01–88.19
See application file for complete search history.

(56) References Cited

U.S. PATENT DOCUMENTS

| | | | |
|---|---|---|---|
| 8,041,019 B2 * | 10/2011 | Pieraccini et al. | 379/209.01 |
| 8,175,248 B2 * | 5/2012 | Agarwal et al. | 379/218.01 |
| 8,437,466 B2 * | 5/2013 | Li | H04M 3/493 379/266.1 |
| 2004/0111269 A1 * | 6/2004 | Koch | 704/275 |
| 2005/0129205 A1 * | 6/2005 | Klein | 379/201.04 |
| 2008/0075243 A1 * | 3/2008 | Kent et al. | 379/88.12 |
| 2010/0119049 A1 * | 5/2010 | Clark | H04M 3/42153 379/201.01 |
| 2010/0158210 A1 * | 6/2010 | Awad et al. | 379/88.04 |
| 2010/0158226 A1 * | 6/2010 | Arsenault | G06F 17/30289 379/142.15 |
| 2010/0329435 A1 * | 12/2010 | Yasrebi | H04M 3/42238 379/88.22 |
| 2011/0051918 A1 * | 3/2011 | Fan et al. | 379/211.02 |
| 2012/0027194 A1 * | 2/2012 | Deshpande et al. | 379/265.01 |
| 2012/0224681 A1 * | 9/2012 | Desai et al. | 379/266.1 |
| 2014/0044246 A1 * | 2/2014 | Klemm et al. | 379/93.01 |

(Continued)

*Primary Examiner* — Solomon Bezuayehu
(74) *Attorney, Agent, or Firm* — Hamilton, Brook, Smith & Reynolds, P.C.

(57) ABSTRACT

Systems and methods of handling customer contacts at a customer care system that streamline the handling of such customer contacts based on information about previous contacts received from the same customers. The system includes a repeat contact engine, which is connectable to at least one data/communications network. The repeat contact engine includes a controller, at least one database communicably connected to the controller, and a data extractor communicably connected between the data/communications network and the database. The controller includes a server, a rule processor communicably connected to the server, and a policy engine associated with the rule processor. Based on information about at least one previous contact, the system can derive a rule that, in response to its application, would cause a predetermined response, representative of the predicted purpose of an incoming contact, to be provided over a corresponding channel through the data/communications network.

21 Claims, 7 Drawing Sheets

(56) References Cited

U.S. PATENT DOCUMENTS

2014/0249873 A1* 9/2014 Stephan ............... G06Q 10/063
　　　　　　　　　　　　　　　　　　　　705/7.11

* cited by examiner

| | |
|---|---|
| Rule A | If the incoming contact has an outstanding account balance, then ask, "I see you recently contacted us. Do you wish to make an account payment?" |
| Policy 1a | Rule A is to be applied to all incoming contacts that had an account payment request during a previous contact, and contact the Company within 30 minutes of the previous contact. |
| Policy 2a | Rule A is to be applied to all incoming contacts that had an account payment request during a previous contact, contact the Company at least 30 minutes after the previous contact but within 3 days of the previous contact, and had begun but not completed an account payment during the previous contact. |

*Fig. 4a*

| | |
|---|---|
| Rule B | If an Internet technical support task was completed during a previous contact, then ask, "I see you recently contacted us. Do you still have an Internet technical support issue?" |
| Policy 1b | Rule B is to be applied to all incoming contacts that had an Internet technical support issue during a previous contact, and contact the Company within 2 days of the previous contact. |

*Fig. 4b*

REPEAT CONTACT ENGINE

TECHNICAL FIELD

The present application relates generally to the handling of customer contacts received at a customer care system over at least one network, and more specifically to systems and methods of streamlining the handling of such customer contacts based on information about previous contacts received at the customer care system from the same customers.

BACKGROUND

In recent years, actual and prospective customers have increasingly employed data and/or communications networks to purchase products/services, as well as to obtain information about and/or support for such products/services. In an effort to assure prompt and convenient customer service, many product/service providers have incorporated automated, network-based customer care systems into their product/service organizations. Such customer care systems typically provide customers with a number of ways to obtain information about and/or support for desired products/services, such as via landline telephones, mobile telephones, mobile devices such as personal digital assistants (PDAs) or smartphones, and/or tablet, laptop, or desktop computers.

In one typical mode of operation, an actual or prospective customer may place a telephone call over the public switched telephone network (PSTN) or a mobile communications network and be connected to a customer care system, which may include an interactive voice response (IVR) system. Once the telephone call is connected to the customer care system, the IVR system may automatically provide a main menu of selection options to the customer via a series of prerecorded messages, and direct the customer to make a selection from the main menu either verbally or by push-button input. For example, such main menu selection options may correspond to account payments, technical support, sales, and/or any other suitable customer service. Upon receipt of the customer's main menu selection, the IVR system may automatically provide one or more additional menus of selection options to the customer, direct the customer to provide additional information regarding his or her inquiry, and/or connect the customer directly to an appropriate customer care agent. By incorporating automated, network-based customer care systems into their organizations, product/service providers can not only provide customers with more prompt and convenient service, but can also avoid having to rely upon their customer care staff to handle customer inquiries that may often be more efficiently handled in an automated fashion.

However, conventional customer care systems have shortcomings. For example, while a customer interacts with an IVR system of a conventional customer care system during an initial telephone call, the telephone call may inadvertently become disconnected from the customer care system, the customer may decide to terminate the telephone call prematurely, or the customer's inquiry may not be resolved completely to his or her satisfaction. At a later date and/or time, the customer may decide to place at least one additional telephone call to the customer care system for either the same reason as the previous call or a different reason. In each case, upon connection to the customer care system, the IVR system may automatically provide the same main menu selection options to the customer, and direct the customer to select an option again from the main menu, thereby forcing the customer to repeat many of the same selections and/or other actions that he or she may have been required to perform during the initial telephone call. Such shortcomings of conventional customer care systems can lead to frustration on the part of some customers, as well as the product/service providers who seek to retain those customers, and can hamper the widespread acceptance of automated service technologies.

It would therefore be desirable to have systems and methods of handling customer contacts received at customer care systems that avoid at least some of the shortcomings of conventional customer care systems discussed above.

SUMMARY

In accordance with the present application, systems and methods of handling customer contacts at a customer care system are disclosed that effectively streamline the handling of such customer contacts based on information about previous contacts received at the customer care system from the same customers. In one aspect, a system for handling customer contacts at a customer care system includes a functional component referred to herein as the "repeat contact engine". In an exemplary aspect, the repeat contact engine is connectable to at least one data and/or communications network (the "network"). The repeat contact engine includes a controller, at least one database communicably connected to the controller, and a data extractor communicably connected between the network and the database. The controller includes a server computer (the "server"), a rule processor communicably connected to the server, and a policy engine associated with the rule processor.

In an exemplary mode of operation, the repeat contact engine receives an incoming contact over at least one of a plurality of data and/or communications channels through the network. In an exemplary aspect, the plurality of data and/or communications channels can include one or more of the Internet (e.g., the World Wide Web), an interactive voice response (IVR) system, an e-mail system, an on-line chat session, a mobile application (a "mobile app"), landline and/or mobile telephone connections, and/or any other suitable types of channel(s). Before determining the purpose of the incoming contact, the data extractor extracts information associated with the incoming contact from the respective channel. In another exemplary aspect, the extracted information can include at least the identity of the incoming contact such as indicated by a username, an account number, an automatic number identifier (ANI), and/or any other suitable identifier(s), the type of channel communication, a time stamp, and/or any other suitable information.

The server can access the database to determine whether or not at least one previous contact received over one or more of the plurality of data and/or communications channels has an identity that is the same as the identity of the incoming contact. The server can then access the database to obtain information about that previous contact, and provide the information about the previous contact to the rule processor. Such information pertaining to the previous contact can include the identity of the previous contact, the type of channel communication, a time stamp, the purpose and/or result of the previous contact, and/or any other suitable information. In an exemplary aspect, information pertaining to at least one outgoing contact generated by the repeat contact engine may be further provided to the rule processor. Based at least on the information about the previous contact, the rule processor can derive at least one rule for intercepting and subsequently handling the incoming contact, and the policy engine can provide at least one policy defining how the rule is to be applied. The server can then apply the rule to the incoming contact, and, in response to the application of the rule, provide, over the respective channel, a predetermined audio and/or visual response representative of the predicted purpose of the incoming contact. In a further exemplary aspect, the predetermined response provided by the server over the respective channel can include at least one message and/or at least one menu of selection options based on the predicted purpose of the incoming contact. The data extractor can then store the information about the incoming contact in the database.

By employing information about at least one previous contact to derive and/or apply at least one rule for intercepting and subsequently handling an incoming contact received over a data and/or communications channel, the disclosed systems and methods can effectively streamline the handling of the incoming contact. For example, the purpose of the previous contact may have been to make an account payment. Further, the time stamps associated with the respective incoming and previous contacts may indicate that the incoming contact occurred within 30 minutes of the previous contact. Based at least on this information, the disclosed systems and methods can derive a rule that, in response to its application, would cause a predetermined response to be provided over the respective channel. For example, the predetermined response provided by an IVR may be a message such as, "I see you recently called, do you wish to make an account payment?" In this way, a main menu of selection options that typically would otherwise have been presented for selection can be bypassed and replaced with one or more targeted messages and/or menu selection options, which may be more likely to address the immediate needs of the incoming contact.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIGS. 4a and 4b are tables illustrating exemplary rules, and exemplary policies associated with the respective rules, which can be derived and/or applied by the repeat contact engine of FIG. 1;

DETAILED DESCRIPTION

Systems and methods of handling customer contacts at a customer care system are disclosed that effectively streamline the handling of such customer contacts based on information about previous contacts received at the customer care system from the same customers. Such systems include a functional component referred to herein as the "repeat contact engine", which can receive incoming contacts over a plurality of data and/or communications channels through one or more data and/or communications networks. The repeat contact engine can extract information associated with an incoming contact from a respective channel, and subsequently store the information about the incoming contact in at least one database. The repeat contact engine can also access the database to determine whether or not at least one previous contact received over one or more of the plurality of data and/or communications channels has an identity that is the same as the identity of the incoming contact. The repeat contact engine can then access the database to obtain information about that previous contact. Based at least on the information about the previous contact, the repeat contact engine can derive and/or apply at least one rule for intercepting and subsequently handling the incoming contact, and, in response to the application of the rule, provide, over a respective channel, a predetermined audio and/or visual response representative of the predicted purpose of the incoming contact. In this way, the repeat contact engine can, for example, replace a main menu of selection options and/or other messages that typically would otherwise have been presented for selection and/or other action, with one or more targeted menu selection options and/or other messages more likely to address the immediate needs of the incoming contact.

Figure 1:
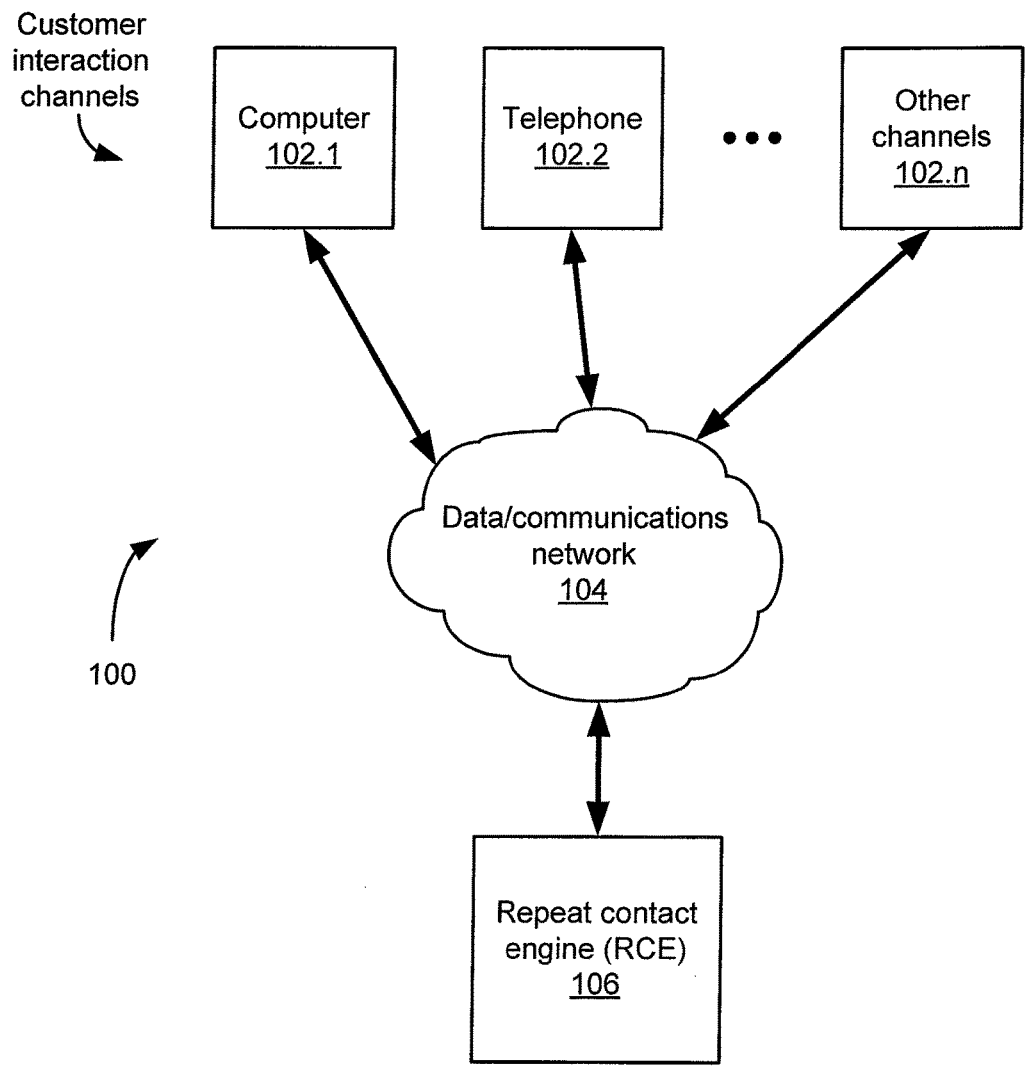
FIG. 1 is a block diagram illustrating a system that incorporates an exemplary repeat contact engine, in accordance with the present application.

FIG. 1 depicts an illustrative embodiment of an exemplary system 100 for handling customer contacts at a customer care system, in accordance with the present application. As shown in FIG. 1, the system 100 includes at least one data and/or communications network 104 (also referred to herein as the "data/communications network"), a plurality of data and/or communications channels 102.1-102.n (also referred to herein as the "customer interaction channels"), and a repeat contact engine (RCE) 106, which may be incorporated into the customer care system of a product/service provider. For example, the data/communications network 104 can include the public switched telephone network (PSTN), a mobile communications network, a voice-over-Internet protocol (VoIP) network, the Internet, a wireless application protocol (WAP) network, a WiFi network, an IEEE 802.11 standards network, a local area network (LAN), a wide area network (WAN), and/or any other suitable network(s). Further, the customer interaction channels 102.1-102.n can include a first customer interaction channel 102.1 accessible by a tablet, laptop, or desktop computer, a second customer interaction channel 102.2 accessible by a landline or mobile telephone 102.2 for connection to an interactive voice response (IVR) system, and/or any other suitable customer interaction channel(s) 102.n accessible by any other suitable computerized or non-computerized device(s).

Figure 2:
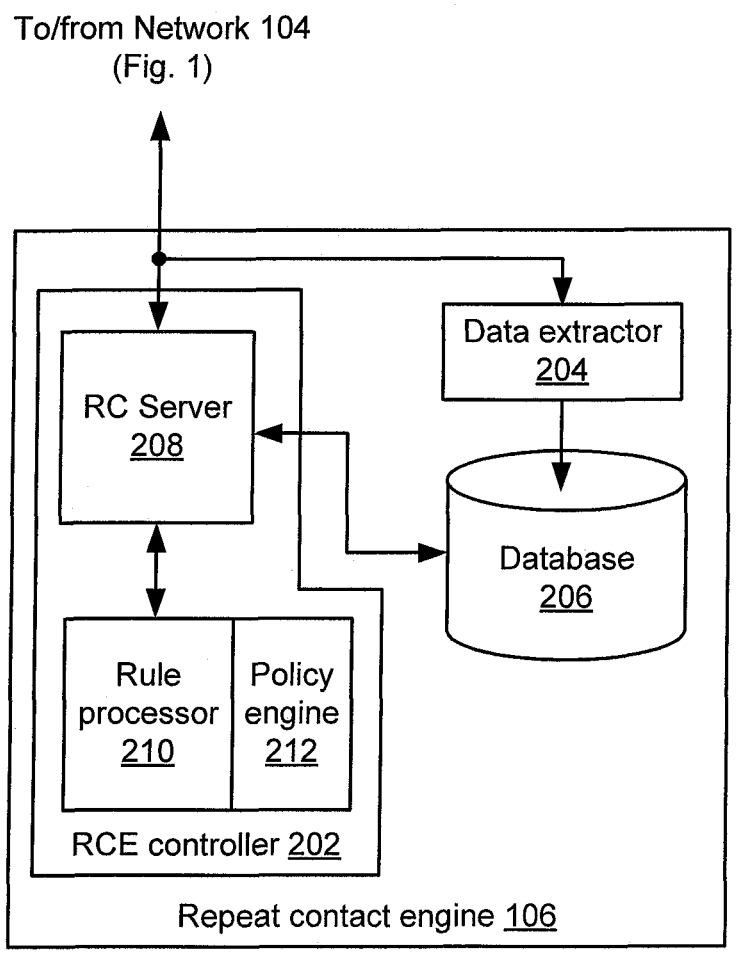
FIG. 2 is a block diagram of the repeat contact engine of FIG. 1.

FIG. 2 depicts a detailed view of the repeat contact engine 106 of FIG. 1. As shown in FIG. 2, the repeat contact engine 106 is communicably connectable to the data/communications network 104 (see FIG. 1). The repeat contact engine 106 includes an RCE controller 202, at least one database 206 communicably connected to the RCE controller 202, and a data extractor 204 communicably connectable between the data/communications network 104 and the database 206. The RCE controller 202 includes a server computer 208 (also referred to herein as the "RC server"), a rule processor 210 communicably connected to the RC server 208, and a policy engine 212 associated with the rule processor 210.

In an illustrative mode of operation, the repeat contact engine 106 can receive an incoming contact (e.g., a web page input, an on-line chat session, a telephone call, etc.) over at least one of the customer interaction channels 102.1-102.n through the data/communications network 104. Before determining the purpose of the incoming contact, the data extractor 204 extracts information associated with the incoming contact from the respective channel. For example, the extracted information can include at least the identity of the incoming contact such as indicated by a username, an account number, an automatic number identifier (ANI), and/or any other suitable identifier(s), the type of channel communication (e.g., a web page input, an on-line chat session, a telephone call, etc.), a time stamp, and/or any other suitable information.

The RC server 208 accesses the database 206 to determine whether or not at least one previous contact received over one or more of the customer interaction channels 102.1-102.n has an identity that is the same as the identity of the incoming contact. The RC server 208 can access the database 206 to obtain information about that previous contact, and provide the information about the previous contact to the rule processor 210. Such information pertaining to the previous contact can include the identity of the previous contact, the type of channel communication, a time stamp, the purpose and/or result of the previous contact, and/or any other suitable information. Based at least on the information about the previous contact, the rule processor 210 can automatically derive and/or apply at least one rule for intercepting and subsequently handling the incoming contact, and the policy engine 212 can provide at least one policy defining how the rule is to be applied. The RC server 208 can then apply the rule to the incoming contact, and, in response to the application of the rule, provide, over the respective channel 102.1 . . . 102.n, a predetermined audio and/or visual response representative of the predicted purpose of the incoming contact. For example, the predetermined response provided by the RC server 208 over the respective channel 102.1 . . . 102.n can include at least one audio and/or visual message, and/or at least one menu of selection options, based on the predicted purpose of the incoming contact. The data extractor 204 can then store the information about the incoming contact in the database 206. In some embodiments, a user (e.g., a customer) may directly contact a customer care agent, who may then manually log the information about the incoming contact in the database 206.

Figure 3:
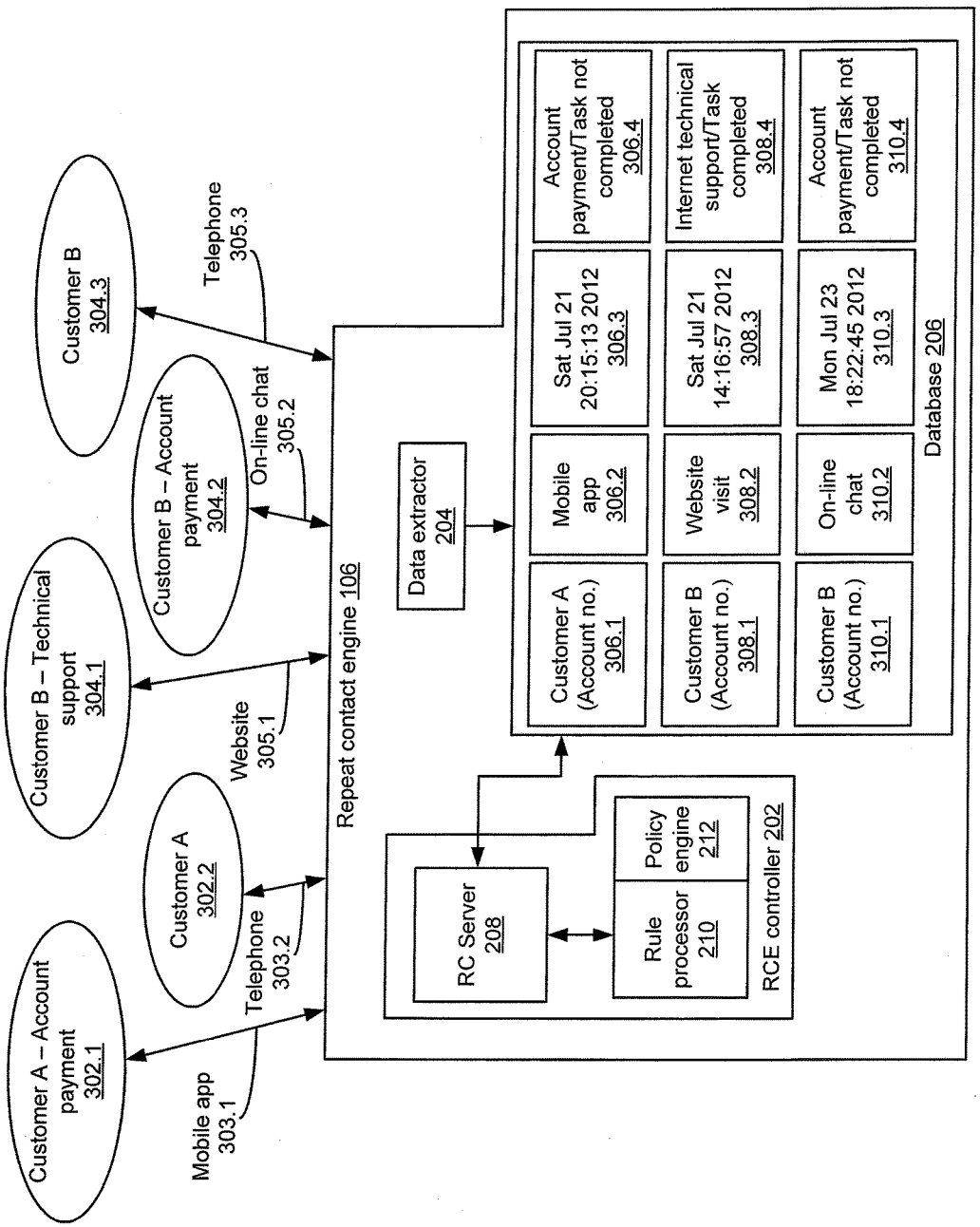
FIG. 3 is a block diagram of an illustrative example of use of the repeat contact engine of FIG. 1.

The disclosed system for handling customer contacts at a customer care system will be further understood with reference to the following illustrative examples and FIGS. 2 and 3. In a first illustrative example, the repeat contact engine 106 receives two (2) incoming contacts 302.1, 302.2 (see FIG. 3) from a first customer, namely, Customer A. Information associated with the first incoming contact 302.1 is received at the repeat contact engine 106 over a customer interaction channel 303.1 (see FIG. 3) via a mobile app running on a PDA, a smartphone, a tablet computer, or any other suitable mobile device. Before determining the purpose of the first incoming contact 302.1, the data extractor 204 within the repeat contact engine 106 extracts the information associated with the first incoming contact 302.1 from the customer interaction channel 303.1. For example, the extracted information can include the identity of Customer A indicated by an account number, the type of channel communication, namely, a mobile app communication, and a time stamp, e.g., "Sat Jul 21 20:15:13 2012". The RC server 208 within the RCE controller 202 accesses the database 206 to determine whether or not it contains any information about a previous contact having the same identity (e.g., the same account number) as the first incoming contact 302.1. In this first illustrative example, however, it is assumed that the RCE controller 202 cannot access any information about any such previous contact from the database 206. For example, such a previous contact may not have been received at the repeat contact engine 106 from Customer A prior to the receipt of the first incoming contact 302.1. Alternatively, one or more such previous contacts may have been received at the repeat contact engine 106 from Customer A, but the repeat contact engine 106 may have determined that the rule(s) for intercepting incoming contacts did not apply based on any of those previous contact(s) from Customer A.

Having determined that the database 206 does not contain any relevant information about a previous contact from Customer A prior to the receipt of the first incoming contact 302.1, the repeat contact engine 106 allows a main application for handling customer contacts to determine the purpose of the first incoming contact 302.1 (e.g., to make an account payment) by providing a menu of selection options to Customer A over the customer interaction channel 303.1. For example, the main application may provide the menu of selection options to Customer A via the mobile app running on Customer A's mobile device, and direct Customer A to make a selection from the menu (e.g., account payment, technical support, etc.). Customer A may then select "Account payment" via the mobile app, thereby disclosing, to the repeat contact engine 106, the purpose of the first incoming contact 302.1 to make an account payment. The data extractor 204 within the repeat contact engine 106 can then store the information associated with the first incoming contact 302.1 in the database 206, namely, the identity of Customer A ("Account no."), the type of channel communication ("Mobile app"), the time stamp ("Sat Jul 21 20:15:13 2012"), and an indication of the purpose of the first incoming contact ("Account payment") in database locations 306.1, 306.2, 306.3, and 306.4, respectively. In this first illustrative example, it is assumed that Customer A does not complete the account payment during the first incoming contact 302.1. Accordingly, the RC server 208 can also specify task completion information for the first incoming contact 302.1, namely, "Task not completed", in the database location 306.4.

Subsequent to the receipt of the first incoming contact 302.1 from Customer A, the repeat contact engine 106 receives the second incoming contact 302.2 from Customer A over a customer interaction channel 303.2 (see FIG. 3) in the form of a telephone call. Before determining the purpose of the second incoming contact 302.2, the data extractor 204 extracts information associated with the second incoming contact 302.2 from the customer interaction channel 303.2. For example, the extracted information can include the identity of Customer A indicated by his or her account number as well as an automatic number identifier (ANI), the type of channel communication, namely, a telephone call, and a time stamp, e.g., "Sat Jul 21 20:35:22 2012". The RC server 208 accesses the database 206 to determine whether or not it contains any information about a previous contact having the same identity (e.g., the same account number and/or ANI) as Customer A. In this first illustrative example, such information about a previous contact having the same identity as Customer A corresponds to the information stored in the database locations 306.1-306.4 associated with the first incoming contact 302.1, which was received at the repeat contact engine 106 before the receipt of the second incoming contact 302.2.

Having determined that the database 206 contains the information stored in the database locations 306.1-306.4 associated with the first incoming contact 302.1 from Customer A, the RC server 208 accesses the database 206 to obtain the information stored in the database locations 306.1-306.4, and provides that information (e.g., the identity 306.1 of Customer A, the type of channel communication 306.2, the time stamp 306.3, and the indications of the purpose, result, and/or task completion information 306.4 pertaining to the first incoming contact 302.1) to the rule processor 210. Based at least on that information about the first incoming contact 302.1, the rule processor 210 derives at least one rule for intercepting and subsequently handling the second incoming contact 302.2. In addition, the policy engine 212 provides at least one policy defining how that rule is to be applied.

FIG. 4a depicts an exemplary table containing a representative rule A that may be derived and/or applied by the rule processor 210, and representative associated policies 1a, 2a that may be provided by the policy engine 212 defining how rule A is to be applied. For example, the rule processor 210 may derive rule A based at least on the information stored in the database locations 306.1-306.4 associated with the first incoming contact 302.1 from Customer A. In some embodiments, the rule(s) derived and/or applied by the rule processor 210, as well as the policy/policies provided by the policy engine 212, can be configured by a user of the repeat contact engine 106. In this first illustrative example, rule A contained in the table of FIG. 4a is as follows: "If the incoming contact has an outstanding account balance, then ask, 'I see you recently contacted us. Do you wish to make an account payment?'" Further, policy 1a contained in the table of FIG. 4a is as follows: "Rule A is to be applied to all incoming contacts that had an account payment request during a previous contact, and contact the Company within 30 minutes of the previous contact." Moreover, policy 2a contained in the table of FIG. 4a is as follows: "Rule A is to be applied to all incoming contacts that had an account payment request during a previous contact, contact the Company at least 30 minutes after the previous contact but within 3 days of the previous contact, and had begun but not completed an account payment during the previous contact." It is noted that any other suitable rule(s) and/or associated policy/policies can be derived, defined, and/or applied for intercepting and subsequently handling incoming contacts.

Because the time stamp for the second incoming contact 302.2, e.g., Sat Jul 21 20:35:22 2012, and the time stamp for the first incoming contact 302.1, e.g., Sat Jul 21 20:15:13 2012", indicate that the second incoming contact 302.2 was received from Customer A within 30 minutes of the first incoming contact 302.1, and the information stored in the database location 306.4 ("Account payment") indicates that there was an account payment request during the first incoming contact 302.1, policy 1a for applying rule A contained in the table of FIG. 4a is satisfied. It is noted that, in this example, a customer need only satisfy one of the policies 1a and 2a to invoke rule A. Having determined that there was an account payment request during the first incoming contact 302.1, the RC server 208 can access the database 206 to obtain Customer A's account information, and to determine whether he or she has an outstanding account balance. In this first illustrative example, it is assumed that Customer A does, in fact, have an outstanding account balance. Because Customer A has an outstanding account balance, an IVR system provides the prerecorded message, "I see you recently contacted us. Do you wish to make an account payment?", to Customer A over the customer interaction channel 303.2, in accordance with rule A (see FIG. 4a). In this way, the repeat contact engine 106 can bypass the presentation of the main menu of selection options, and replace it with a targeted message representative of the predicted purpose of Customer A, e.g., the predicted purpose to make an account payment.

It is noted that the predicted purpose of Customer A, e.g., to make an account payment, may not correspond to the actual purpose of the second incoming contact 302.2. For example, the actual purpose of the second incoming contact 302.2 may be to request technical support. Once it is determined that the predicted purpose does not match the actual purpose of the second incoming contact 302.2, the main application for handling customer contacts can determine the actual purpose of the second incoming contact 302.2 (e.g., to request technical support) by providing a menu of selection options to Customer A over the customer interaction channel 303.2. Moreover, the data extractor 204 within the repeat contact engine 106 can subsequently store the information associated with the second incoming contact 302.2 in the database 206. It is further noted that FIG. 3 depicts only the information in the database locations 306.1-306.4 for the first incoming contact 302.1 of Customer A for clarity of illustration.

In a second illustrative example, the repeat contact engine 106 receives three (3) incoming contacts 304.1-304.3 (see FIG. 3) from a second customer, namely, Customer B. Information associated with the first incoming contact 304.1 is received at the repeat contact engine 106 over a customer interaction channel 305.1 (see FIG. 3) in the form of a website visit. Before determining the purpose of the first incoming contact 304.1, the data extractor 204 extracts the information associated with the incoming contact 304.1 from the customer interaction channel 305.1. For example, the extracted information can include the identity of Customer B indicated by an account number or username, the type of channel communication, namely, a website visit, and a time stamp, e.g., "Sat Jul 21 14:16:57 2012". The RC server 208 accesses the database 206 to determine whether or not it contains any information about a previous contact having the same identity (e.g., the same account number or username) as the first incoming contact 304.1. In this second illustrative example, it is assumed that no such previous contact was received at the repeat contact engine 106 from Customer B prior to the receipt of the first incoming contact 304.1.

Having determined that the database 206 does not contain any information about a previous contact received from Customer B prior to the receipt of the first incoming contact 304.1, the main application for handling customer contacts determines the purpose of the first incoming contact 304.1 (e.g., to request Internet technical support) by providing a menu of selection options to Customer B over the customer interaction channel 305.1. For example, the website may provide the menu of selection options to Customer B, who may, using a mouse, trackball, or any other suitable input device, click on a radio button or link on the website corresponding to Internet technical support, thereby disclosing, to the repeat contact engine 106, the purpose of the first incoming contact 304.1. The data extractor 204 can then store the information associated with the first incoming contact 304.1 in the database 206, namely, the identity of Customer B ("Account no."), the type of channel communication ("Website visit"), the time stamp ("Sat Jul 21 14:16:57 2012"), and the purpose of the first incoming contact 304.1 ("Internet technical support") in database locations 308.1, 308.2, 308.3, and 308.4, respectively. In this second illustrative example, it is assumed that the result of the first incoming contact 304.1 is successful diagnosis and repair of an Internet technical support issue. Accordingly, the RC server 208 can also specify the result of the first incoming contact 304.1 ("Task completed") in the database location 308.4.

Subsequent to the receipt of the first incoming contact 304.1 from Customer B, the repeat contact engine 106 receives the second incoming contact 304.2 from Customer B over a customer interaction channel 305.2 (see FIG. 3) in the form of a text based message in an on-line chat session. Before determining the purpose of the second incoming contact 304.2, the data extractor 204 extracts information associated with the second incoming contact 304.2 from the customer interaction channel 305.2. For example, the extracted information can include the identity of Customer B indicated by his or her account number as well as a username, the type of channel communication, namely, an on-line chat session, and a time stamp, e.g., "Mon Jul 23 18:22:45 2012". The RC server 208 accesses the database 206 to determine whether or not it contains any information about a previous contact having the same identity (e.g., the same account number and/or username) as Customer B. In this second illustrative example, such information about a previous contact having the same identity as Customer B corresponds to the information stored in the database locations 308.1-308.4 associated with the first incoming contact 304.1, which was received at the repeat contact engine 106 before the receipt of the second incoming contact 304.2.

Having determined that the database 206 contains the information stored in the database locations 308.1-308.4 associated with the first incoming contact 304.1 received from Customer B, the RC server 208 accesses the database 206 to obtain the information stored in the database locations 308.1-308.4, and provides that information (e.g., the identity 308.1 of Customer B, the type of channel communication 308.2, the time stamp 308.3, and the indications of the purpose, result, and/or task completion information 308.4 pertaining to the first incoming contact) to the rule processor 210.

FIG. 4b depicts an exemplary table containing a representative rule B that may be derived and/or applied by the rule processor 210, and a representative associated policy 1b that may be provided by the policy engine 212 defining how rule B is to be applied. For example, the rule processor 210 may derive rule B based at least on the information stored in the database locations 308.1-308.4 associated with the first incoming contact 304.1 from Customer B. In this second illustrative example, rule B contained in the table of FIG. 4b is as follows: "If an Internet technical support task was completed during a previous contact, then ask, 'I see you recently contacted us. Do you still have an Internet technical support issue?'" Further, policy 1b contained in the table of FIG. 4b is as follows: "Rule B is to be applied to all incoming contacts that had an Internet technical support issue during a previous contact, and contact the Company within 2 days of the previous contact."

As shown in FIG. 3, the information stored in the database location 308.4 ("Internet technical support/Task completed") indicates that a request for Internet technical support was made during the first incoming contact 304.1, and that diagnosis and repair tasks relating to the Internet technical support were completed during the first incoming contact 304.1. However, the time stamp for the second incoming contact 304.2, e.g., Mon Jul 23 18:22:45 2012, and the time stamp for the first incoming contact 304.1, e.g., Sat Jul 21 14:16:57 2012", indicate that the second incoming contact 304.2 was received from Customer B more than 2 days after the first incoming contact 304.1. Policy 1b for applying rule B is therefore not satisfied, and the rule processor 210 does not apply rule B. The main application for handling customer contacts then obtains information relating to the purpose of the second incoming contact 304.2 (e.g., to make an account payment) by generating and providing automated text to Customer B over the customer interaction channel 305.2 requesting such information. Moreover, the data extractor 204 within the repeat contact engine 106 subsequently stores the information associated with the second incoming contact 302.2 in the database 206, namely, the identity of Customer B ("Account no."), the type of channel communication ("On-line chat"), the time stamp ("Mon Jul 23 18:22:45 2012"), and an indication of the purpose of the second incoming contact 304.2 ("Account payment") in database locations 310.1, 310.2, 310.3, and 310.4, respectively. In this second illustrative example, it is assumed that Customer B begins but does not complete an account payment during the second incoming contact 304.2. Accordingly, the RC server 208 can also specify task completion information for the second incoming contact 304.2, namely, "Task not completed", in the database location 310.4.

Subsequent to the receipt of the second incoming contact 304.2 from Customer B, the repeat contact engine 106 receives the third incoming contact 304.3 from Customer B over a customer interaction channel 305.3 (see FIG. 3) in the form of a telephone call. Before determining the purpose of the third incoming contact 304.3, the data extractor 204 extracts information associated with the incoming contact 304.3 from the customer interaction channel 305.3. For example, the information extracted from the customer interaction channel 305.3 may include the identity of Customer B indicated by his or her account number and/or ANI, the type of channel communication, namely, a telephone call, and a time stamp, e.g., "Mon Jul 23 21:05:45 2012". The RC server 208 accesses the database 206 to determine whether or not it contains any information about a previous contact from Customer B. In this second illustrative example, it is assumed that such a previous contact from Customer B corresponds to the second incoming contact 304.2, which was received at the repeat contact engine 106 before the receipt of the third incoming contact 304.3.

Having determined that the database 206 contains information about at least the second incoming contact 304.2 from Customer B, the RC server 208 accesses the database 206 to obtain that information, and provides that information, including the information stored in the database locations 310.1-310.4 (e.g., the identity 310.1 of Customer B, the type of channel communication 310.2, the time stamp 310.3, and the indications of the purpose, result, and/or task completion information 310.4 pertaining to the second incoming contact 304.2) to the rule processor 210.

In this second illustrative example, the rule processor 210 applies rule A contained in the table of FIG. 4a, as well as its associated policies 1a, 2a for intercepting and subsequently handling the third incoming contact 304.3. Because the time stamp for the third incoming contact 304.3, e.g., Mon Jul 23 21:05:45 2012, and the time stamp for the second incoming contact 304.2, e.g., Sat Jul 23 18:22:45 2012", indicates that the third incoming contact 304.3 was received from Customer B more than 30 minutes after, but within 3 days of, the second incoming contact 304.2, there was an account payment request during the second incoming contact 304.2, and the account payment task was not completed during the second incoming contact 304.2, policy 2a for applying rule A contained in the table of FIG. 4a is satisfied. An IVR system therefore provides a voice message to Customer B over the customer interaction channel 305.3, containing the message, "I see you recently contacted us. Do you wish to make an account payment?" In this way, the repeat contact engine 106 provides a targeted message representative of the predicted purpose of the third incoming contact 304.3 from Customer B, e.g., the predicted purpose to make an account payment, thereby bypassing the presentation of the main menu of selection options.

It is noted that the predicted purpose of Customer B, e.g., to make an account payment, may not correspond to the actual purpose of the third incoming contact 304.3. For example, the actual purpose of the third incoming contact 304.3 may be to request technical support. Once it is determined that the predicted purpose does not match the actual purpose of the third incoming contact 304.3, the main application for handling customer contacts can determine the actual purpose of the third incoming contact 304.3 (e.g., to request technical support) by providing a menu of selection options to Customer B over the customer interaction channel 305.3. Moreover, the data extractor 204 within the repeat contact engine 106 can subsequently store the information associated with the third incoming contact 304.3 in the database 206. It is further noted that FIG. 3 depicts only the information in the database locations 308.1-308.4 and 310.1-310.4 pertaining to the first and second incoming contacts 304.1 and 304.2, respectively, of Customer B for clarity of illustration.

Figure 5:
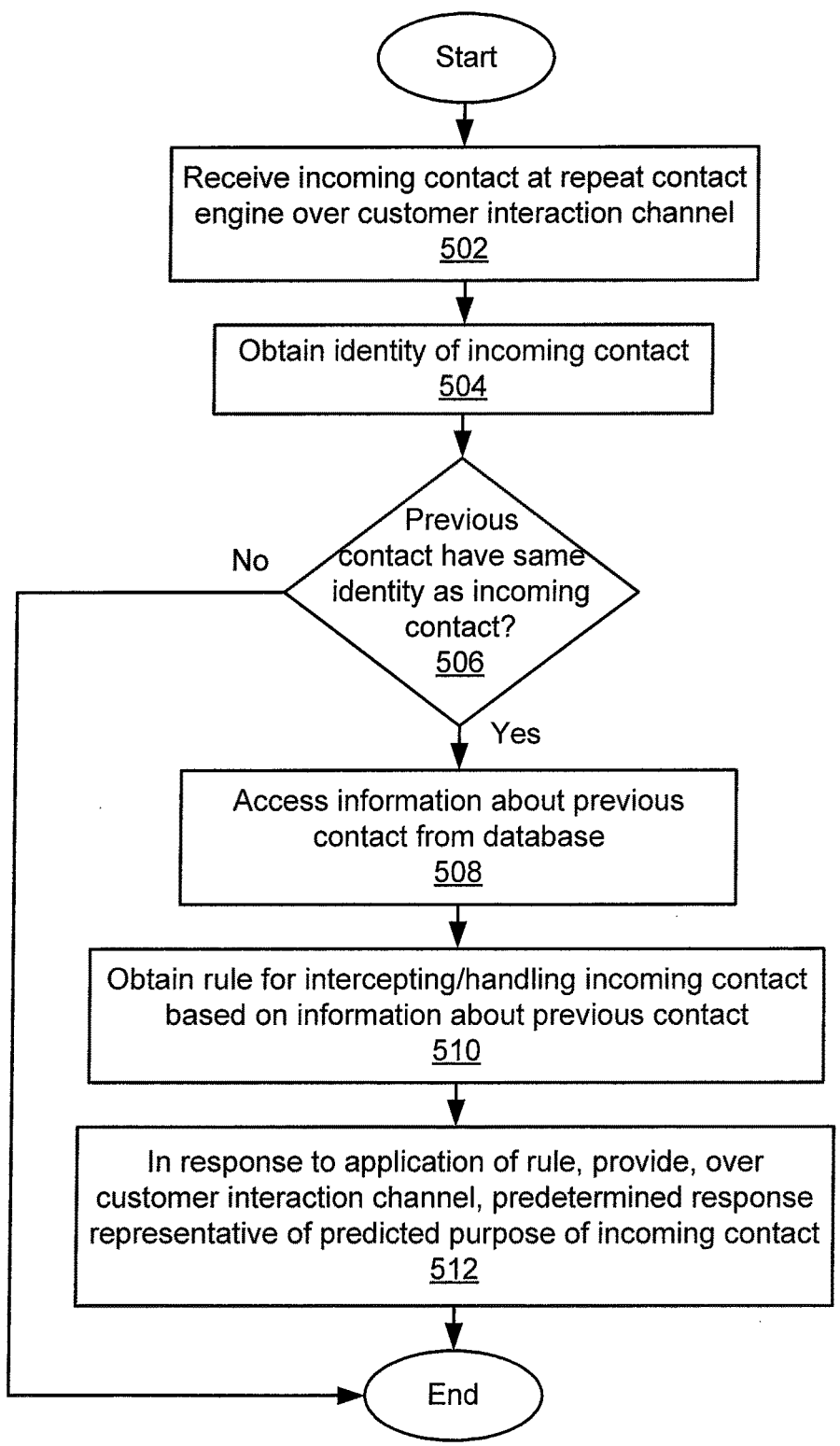
FIG. 5 is a flow diagram of an exemplary method of operating the repeat contact engine of FIG. 1.

An exemplary method of operating the disclosed repeat contact engine is described below with reference to FIGS. 1, 2, and 5. As depicted in block 502, an incoming contact is received at the repeat contact engine 106 over one of the customer interaction channels 102.1-102.n, and, as depicted in block 504, the identity of the incoming contact is obtained. As depicted in block 506, a determination is made as to whether or not at least one previous contact received over one or more of the customer interaction channels 102.1-102.n has an identity that is the same as the identity of the incoming contact. As depicted in block 508, information is accessed, from the database 206, about the previous contact having the same identity as the incoming contact. As depicted in block 510, at least one rule is obtained for intercepting and subsequently handling the incoming contact, based at least on the information about the previous contact. As depicted in block 512, in response to application of the rule, a predetermined response is provided over the respective customer interaction channel 102.1 . . . 102.n, in which the predetermined response is representative of the predicted purpose of the incoming contact.

Figure 6:
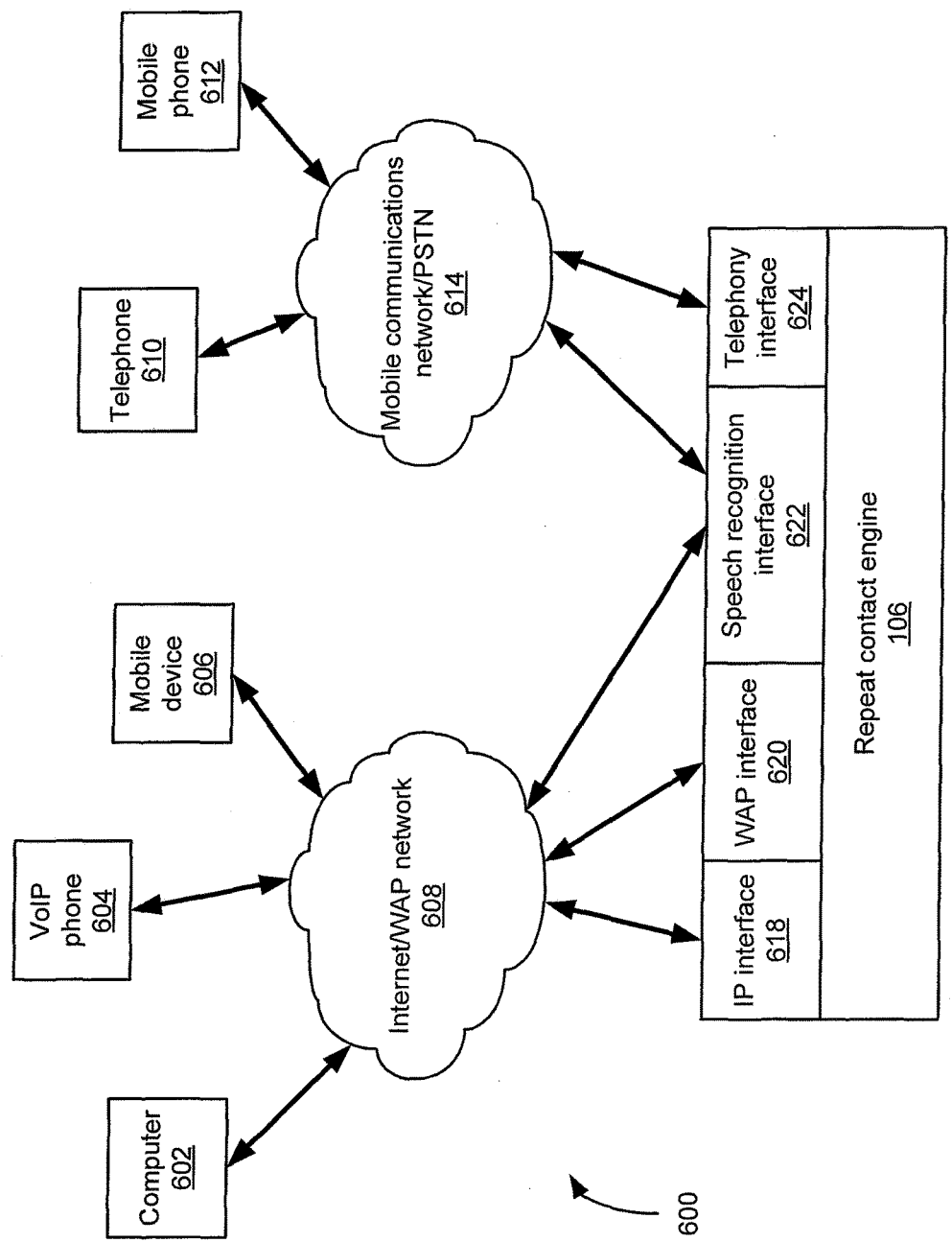
FIG. 6 is a block diagram of an exemplary customer care system including the repeat contact engine of FIG. 1.

FIG. 6 depicts an exemplary customer care system 600 that includes the repeat contact engine 106 of FIG. 1. As shown in FIG. 6, the customer care system 600 includes a data/communications network 608 that includes at least the Internet and/or a WAP network, and a data/communications network 614 that includes at least the PSTN and/or a mobile communications network. The repeat contact engine 106 includes a plurality of interfaces for interfacing with the data/communications network 608, including, but not limited to, an IP interface 618, a WAP interface 620, and/or a speech recognition interface 622. The repeat contact engine 106 further includes a plurality of interfaces for interfacing with the data/communications network 614, including, but not limited to, the speech recognition interface 622 and/or a telephony interface 624. Customers can interact with the repeat contact engine 106 over a plurality of customer interaction channels 602, 604, 606 through the data/communications network 608. For example, customers can access the customer interaction channel 602 using a tablet, laptop, or desktop computer, the customer interaction channel 604 using a VoIP phone, and the customer interaction channel 606 using a mobile device such as a PDA or smartphone. Customers can also interact with the repeat contact engine 106 over a plurality of customer interaction channels 610, 612 through the data/communications network 614. For example, customers can access the customer interaction channel 610 using a landline telephone, and the customer interaction channel 612 using a mobile phone.

Figure 7:
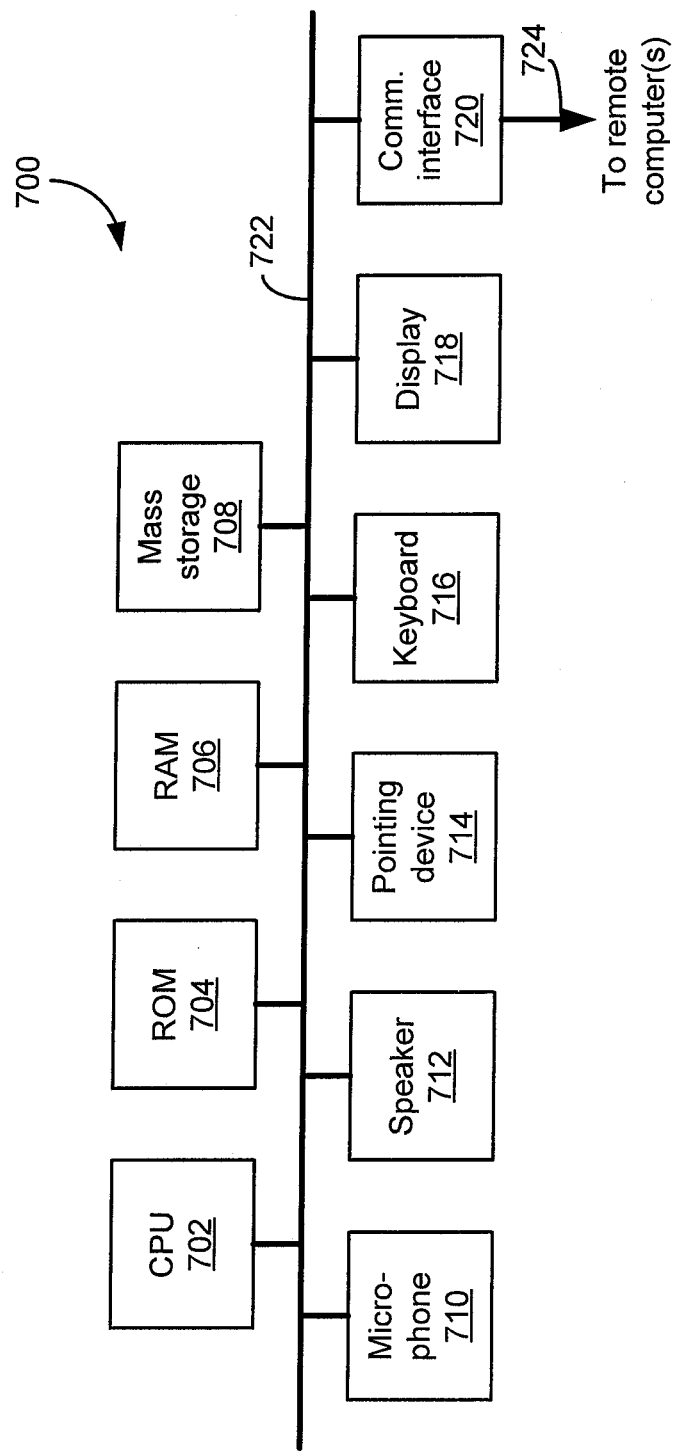
FIG. 7 is a block diagram of an exemplary computing system that can be configured to implement the repeat contact engine of FIG. 1.

FIG. 7 depicts an exemplary computer system 700 that can be configured to implement the repeat contact engine 106 of FIG. 1. Those of ordinary skill in the art will recognize that many variations upon the computer system 700 can be made to implement the various components and/or functionalities of the repeat contact engine 106. As shown in FIG. 7, the computer system 700 includes a central processing unit (CPU) 702 (e.g., a microprocessor or microcontroller), a read-only memory (ROM) 704, a random access memory (RAM) 706, and a mass storage device 708, each coupled to a bus 722. For example, the bus 722 may include one or more physical buses coupled to one another through one or more bridges, controllers, and/or adapters. Further, the bus 722 may include a system bus coupled to one or more peripheral buses, such as a peripheral component interconnect (PCI) bus, and/or any other suitable peripheral bus. The computer system 700 also includes a microphone 710, a speaker 712, a pointing device 714, a keyboard 716, a display 718, and a data/communications interface 720.

The mass storage device 708 can include any suitable device for storing large volumes of data, such as a magnetic disk or tape, a magneto-optical (MO) storage device, and/or a flash memory. The microphone 710 and the speaker 712 can be components of a telephone I/O device (e.g., a handset or headset) to allow a user of the computer system 700 (e.g., a customer care agent) to speak with a telephone caller. The pointing device 714 can be any suitable device for enabling a user to position a cursor or pointer on the display 718, such as a mouse, trackball, touchpad, or touch-sensitive display screen. The display 718 can be any suitable device for displaying alphanumeric, graphical, and/or video information to a user, such as a cathode ray tube (CRT) display, a light emitting diode (LED) display, or a liquid crystal display (LCD). The data/communications interface 720 can be any suitable device for enabling the computer system 700 to communicate with remote computing system(s) over a data/communications link 724, such as a conventional telephone modem, a cable modem, an Integrated Services Digital Network (ISDN) adapter, a Digital Subscriber Line (xDSL) adapter, an Ethernet adapter, etc.

Having described the above exemplary embodiments of the disclosed systems and methods, other alternative embodiments or variations may be made. For example, it was described herein that the disclosed repeat contact engine can access a database to determine whether or not at least one previous contact received over one or more of a plurality of data/communications channels has an identity that is the same as the identity of an incoming contact. In some embodiments, in the event it is determined that such a previous contact exists, a specialized tag (also referred to herein as the "repeat contact tag") can be associated with the information pertaining to one or both of the incoming contact and the previous contact. The repeat contact tag can then be used to facilitate the tracking of multiple contacts received at the repeat contact engine from the same customer.

In addition, it was described herein that the disclosed repeat contact engine can derive and/or apply at least one rule for intercepting and subsequently handling incoming contacts based on information about one or more previous contacts. In some embodiments, the repeat contact engine can be configured with a predetermined table of rules and associated policies that it can use for intercepting and handling such incoming contacts. Such a table of rules and associated policies may be configurable by a user of the repeat contact engine.

It is noted that the intercept criteria, interception rules, and subsequent system behavior described herein can vary by channel. Further, the system behavior invoked by the rules can manifest itself in different ways on different channels. For example, on a website, the system may add relevant links in one or more prominent locations, in a chat session, the system may help a chat agent with predicted pre-written prompts, etc. In one embodiment, a user (e.g., a customer) contacting the system from the web may have a set of intercept criteria applied to him or her by the repeat contact engine that is different from a corresponding set of intercept criteria that may be applied to a telephone user. For example, for the web user, policy 2a defining how rule A of FIG. 4a is to be applied might be changed as follows: "Rule A is to be applied to all incoming contacts from the web that had an account payment request during a previous contact, contact the Company at least 5 minutes after a previous contact but within 6 hours of the previous contact, and had begun but not completed an account payment during the previous contact." Further, in response to his or her incoming contact, the repeat contact engine may present the web user with a screen posing one or more questions applicable to the web user. Any other suitable intercept criteria and/or system behaviors based on the type of channel used are also possible.

It is further noted that some portions of the preceding description may be viewed as being presented in terms of algorithms and/or symbolic representations of operations on data within a computer memory. Such algorithms are generally conceived to be sequences of operations leading to a desired result. Further, such operations are generally those requiring physical manipulations of physical quantities. Usually, though not necessarily, such quantities take the form of electrical or magnetic signals capable of being stored, transferred, combined, compared, and/or otherwise manipulated. Such signals can be referred to using terms such as bits, values, elements, symbols, characters, numbers, or the like.

Moreover, unless specifically stated otherwise, terms such as "processing", "computing", "calculating", "determining", "displaying", or the like, refer to the actions and/or processes of a computer system or similar computerized device that manipulates and transforms data, represented as physical quantities (electronic, magnetic) within the computer system's registers and/or memories, into other data similarly represented as physical quantities within the computer system's registers and/or memories, or other such information storage, transmission, and/or display devices.

The present application also relates to an apparatus for performing the operations described herein. Such an apparatus may be specially constructed for the required purpose, or it may comprise a general-purpose computer selectively activated or reconfigured by a computer program stored within the computer. Such a computer program may be stored in a machine-accessible medium, also referred to herein as a computer-readable medium, such as, but not limited to, any suitable type of disk including floppy disks, optical disks, CD-ROMs, and/or magnetic-optical disks, read-only memories (ROMs), random access memories (RAMs), EPROMs, EEPROMs, magnetic or optical cards, and/or any suitable type of media for storing electronic instructions, each coupleable to a system bus.

It is noted that the processes described herein are not inherently related to any particular computer or other apparatus. Various general-purpose systems may be used with programs in accordance with the teachings herein, or it may prove convenient to construct a more specialized apparatus to perform the operations described herein. The required structure for a variety of such systems will be evident from the above description. In addition, the present application is not described with reference to any particular programming language. It will be appreciated that a variety of programming languages may be used to implement the teachings herein.

It will be further appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A computer-implemented method of automatically directing a communication within an interactive communication response (ICR) system, the method comprising:
at a server of the interactive communication response (ICR) system:
obtaining an identity of a received incoming contact from a user to the ICR system;
determining whether a previous contact of the ICR system has an identity that is the same as the identity of the incoming contact received at the ICR system, wherein the previous contact is received over a first type of communication channel, and the incoming contact is received over a second type of communication channel, the second type of communication channel being different from the first type of communication channel;
applying at least one rule for handling the incoming contact at the ICR system, the at least one rule determined by information about the previous contact loaded from a first database of previous contacts including a time stamp of a previously received contact, a communication type, and a purpose of the previous contact and by information about the user associated with the identity loaded from a second database of account information, the at least one rule indicating application to the previous contact if the difference of the time stamp of the previous contact and the time stamp of the received incoming contact is below a per-purpose threshold of the at least one rule; and
responsive to application of the at least one rule, generating a direct path of a single menu selection of the ICR system unique to the user, the menu selection representative of a predicted purpose of the incoming contact at the ICR system, the predicted purpose of the incoming contact based on the information about the previous contact and the information about the user.

2. The method of claim 1 wherein the obtaining of the identity of the received incoming contact includes extracting information about the incoming contact the information about the incoming contact including one or more of the identity of the incoming contact, an indication of a type of communication channel over which the incoming contact was received, and a time stamp.

3. The method of claim 2 further including storing the information about the incoming contact in the database.

4. The method of claim 1, further comprising automatically deriving the rule based at least on the information about the previous contact.

5. The method of claim 4 further including obtaining at least one policy defining how the rule is to be applied.

6. The method of claim 1 wherein the providing of the predetermined response includes providing one or more of an audio response and a visual response over the respective communication channel.

7. The method of claim 1, further comprising accessing the information about the previous contact from the database storing information about a plurality of previous contacts, each previous contact having the same identity as the incoming contact.

8. The method of claim 7 wherein the obtaining of the rule includes obtaining the rule for handling the incoming contact based at least on the information about the plurality of previous contacts.

9. A customer care system for automatically directing a communication within an interactive communication response (ICR) system, comprising:
a server of the interactive communication response (ICR) system operative to obtain an identity of a received incoming contact from a user to the ICR system and to determine whether a previous contact of the ICR system has an identity that is the same as the identity of the incoming contact received at the ICR system, wherein the previous contact is received over a first type of communication channel, and the incoming contact is received over a second type of communication channel, the second type of communication channel being different from the first type of communication channel; and
a rule processor operative to apply at least one rule for handling the incoming contact at the ICR system, the at least one rule determined by information about the previous contact loaded from a first database of previous contacts including a time stamp of a previously received contact, a communication type, and a purpose of the previous contact and by information about the user associated with the identity loaded from a second database of account information, the at least one rule indicating application to the previous contact if the difference of the time stamp of the previous contact and the time stamp of the received incoming contact is below a per-purpose threshold of the at least one rule;
wherein the server is further operative, responsive to application of the at least one rule, to generate a direct path of a single menu selection of the ICR system unique to the user, the menu selection representative of a predicted purpose of the incoming contact at the ICR system, the predicted purpose of the incoming contact based on the information about the previous contact and the information about the user.

10. The system of claim 9 further including a policy engine operative to obtain at least one policy defining how the rule is to be applied.

11. The system of claim 9 wherein the server is further operative to provide one or more of an audio response and a visual response.

12. The system of claim 9 wherein the server is further operative to access, from the memory information about a plurality of previous contacts, each previous contact having the same identity as the incoming contact.

13. The system of claim 12 wherein the rule processor is further operative to obtain at least one rule for handling the incoming contact based at least on the information about the plurality of previous contacts.

14. A non-transitory machine-accessible medium for storing instructions for automatically directing a communication within an interactive communication response (ICR) system that, if executed by a processor, will cause the processor to perform operations comprising:
at a server of the interactive communication response (ICR) system:
obtaining an identity of a received incoming contact from a user to the ICR system;
determining whether a previous contact of the ICR system has an identity that is the same as the identity of the incoming contact received at the ICR system, wherein the previous contact is received over a first type of communication channel, and the incoming contact is received over a second type of communication channel, the second type of communication channel being different from the first type of communication channel;
applying at least one rule for handling the incoming contact at the ICR system, the at least one rule determined by information about the previous contact loaded from a first database of previous contacts including a time stamp of a previously received contact, a communication type and a purpose of the previous contact and by information about the user associated with the identity loaded from a second database of account information, the at least one rule indicating application to the previous contact if the difference of the time stamp of the previous contact and the time stamp of the received incoming contact is below a per-purpose threshold of the at least one rule; and
responsive to application of the at least one rule, generating a direct path of a single menu selection of the ICR system unique to the user, the menu selection representative of a predicted purpose of the incoming contact at the ICR system, the predicted purpose of the incoming contact based on the information about the previous contact and the information about the user.

15. The non-transitory machine-accessible medium of claim 14, wherein the obtaining of the identity of the received incoming contact includes extracting information about the incoming contact the information about the incoming contact including one or more of the identity of the incoming contact, an indication of a type of communication channel over which the incoming contact was received, and a time stamp.

16. The non-transitory machine-accessible medium of claim 15, wherein the instructions further cause the processor to store the information about the incoming contact in the database.

17. The non-transitory machine-accessible medium of claim 14, wherein the instructions further cause the processor to automatically derive the rule based at least on the information about the previous contact.

18. The non-transitory machine-accessible medium of claim 17, wherein the instructions further cause the processor to obtain at least one policy defining how the rule is to be applied.

19. The non-transitory machine-accessible medium of claim 14, wherein the providing of the predetermined response includes providing one or more of an audio response and a visual response over the respective communication channel.

20. The non-transitory machine-accessible medium of claim 14, wherein the instructions further cause the processor to access the information about the previous contact from the database storing information about a plurality of previous contacts, each previous contact having the same identity as the incoming contact.

21. The non-transitory machine-accessible medium of claim 20, wherein the obtaining of the rule includes obtaining the rule for handling the incoming contact based at least on the information about the plurality of previous contacts.

* * * * *